United States Patent [19]
Brown

[11] 3,964,455
[45] June 22, 1976

[54] VALVE CONTROL MECHANISM
[75] Inventor: Donald R. Brown, Utica, Mich.
[73] Assignee: General Motors Corporation, Detroit, Mich.
[22] Filed: Dec. 19, 1974
[21] Appl. No.: 534,211

[52] U.S. Cl. .......................... 123/90.43; 123/90.16; 123/90.62
[51] Int. Cl.² ........................................... F01L 1/18
[58] Field of Search.......... 123/90.12, 90.13, 90.14, 123/90.16, 90.39, 90.43, 90.41, 90.46, 90.62

[56] References Cited
UNITED STATES PATENTS

| | | | |
|---|---|---|---|
| 1,607,128 | 11/1926 | Johansen | 123/90.62 |
| 2,808,818 | 10/1957 | Sampietro | 123/90.43 |
| 2,853,984 | 9/1958 | Sampietro | 123/90.43 |
| 2,863,430 | 12/1958 | Sampietro | 123/90.43 |
| 2,934,051 | 4/1960 | Drew | 123/90.43 |
| 3,009,450 | 11/1961 | Engemann | 123/90.43 |
| 3,147,745 | 9/1964 | Kilgore | 123/90.43 |
| 3,169,515 | 2/1965 | Kilgore | 123/90.43 |
| 3,463,131 | 8/1969 | Dolby | 123/90.43 |
| 3,716,036 | 2/1973 | Kruger | 123/90.43 |
| 3,859,969 | 1/1975 | Davis | 123/90.62 |

*Primary Examiner*—Charles J. Myhre
*Assistant Examiner*—Daniel J. O'Connor
*Attorney, Agent, or Firm*—Arthur N. Krein

[57] ABSTRACT

A valve control mechanism for effecting split engine operation of an internal combustion engine, the engine being of the overhead valve type in which each valve is actuated by a rocker arm fulcrumed intermediate its ends on a semi-spherical pivot bearing positioned on a mounting stud fixed to the cylinder head of the engine, one end of the rocker arm engaging the stem of the valve and its other end being engaged by a reciprocating push rod, the valve control mechanism including a piston type hydraulic actuator positioned to move the rocker arm and its pivot bearing axially on a mounting stud against the biasing action of a spring normally holding the rocker arm in an operating position to a position at which the rocker arm is then fulcrumed on the end of the valve stem, normal lash take-up being maintained by the use of a two-piece push rod that includes a spring biased push rod plunger telescopically received in one end of a push rod.

6 Claims, 3 Drawing Figures

VALVE CONTROL MECHANISM

This invention relates to a valve control mechanism for an internal combustion engine and, in particular, to a valve control mechanism for effecting split engine operation.

A split engine and its basic mode of operation has previously been disclosed in U.S. Pat. No. 2,954,022, entitled "Split Engine" issued Sept. 27, 1960, to Stanley H. Mick. As explained in the aforenoted patent, it has been found that considerable economy can be realized when it is possible to resort to split engine operation, for example, being able to operate an 8-cylinder engine on four cylinders under moderate load conditions. The economy is effected by the fact that individual cylinder efficiency is increased when the individual cylinder load is increased during split engine operation in contrast to reduced cylinder loads as would occur with full engine operation during light or moderate load conditions.

It is an inherent characteristic of an internal combustion engine to be most efficient under high load conditions. This is attributable to the quantity of air fed to the cylinders. Maximum air is supplied to the cylinders when the throttle is opened, indicative of high load, therefore, more air may be compressed in turn increasing the compression ratio. Since engine efficiency increases with compression pressure and compression pressure increases with cylinder load, the desirability of split or part cylinder engine operation as a means for maintaining high cylinder load becomes apparent.

However, in the known prior art systems, when engine operation has been shifted from, for example 8-cylinder operation to 4-cylinder operation, some of the benefits to be gained by 4-cylinder operation have been lost due to the fact that some work is being continuously performed in the unloaded cylinders of the engine.

Accordingly, it is the primary object of this invention to provide an improved valve operating mechanism for effecting split engine operation whereby the valves for preselected cylinders of the engine can be rendered inoperative, when desired.

Another object of this invention is to provide a valve control mechanism for an internal combustion engine that is adapted to automatically shift engine operation between, for example, 8-cylinder and 4-cylinder operation as a function of engine load by effecting the operation or non-operation of the valves for preselected cylinders of the engine.

These and other objects of the invention are obtained by means of a valve control mechanism used to control the operation or non-operation of the valves for preselected cylinders of an internal combustion engine, of the overhead valve type. In this valve control mechanism, a poppet valve is normally actuated by a rocker arm, one end of which engages the stem of the valve while its opposite end is actuated by a reciprocating push rod, the rocker arm intermediate its end being normally fulcrumed by a semi-spherical bearing that is slidably mounted on a support stud and is normally positioned axially on the support stud by a spring so as to serve as the pivot for the rocker arm. The support stud, fixed to the cylinder head of the engine, extends axially into a hydraulic cylinder bore provided in the cylinder head. A piston reciprocably mounted in the cylinder bore forms with the cylinder bore a fluid chamber in which fluid under pressure can be supplied and from which fluids can be withdrawn in compliance with engine load whereby the piston can be made operative to effect axial movement of the semi-spherical bearing on the support stud from a position pivotally supporting the rocker arm to a position at which the rocker arm is no longer pivotally supported by the bearing but is then fulcrumed about the stem of the poppet valve and thus is inoperative to effect opening movement of the poppet valve. The push rod is a variable length rod so that normal lash take-up is maintained during all modes of engine operation.

For a better understanding of the invention, as well as other objects and further features thereof, reference is had to the following detailed description of the invention to be read in connection with the accompanying drawings, wherein.

The invention will be described with reference to an 8-cylinder internal combustion engine, although it will be apparent that the invention can be applied to engines having any number of cylinders in excess of one so that split engine operation could be effected.

It will be apparent that in such an engine, the alternate firing cylinders will probably be selected for active or inactive cylinders, as desired. In other words, for an 8-cylinder engine having a normal firing order of, for example, 1-8-4-3-6-5-7-2, the active cylinder group can then be, for example, cylinders 1-4-6-7, while the remaining cylinders would then be those which would be either active or inactive depending on engine load in a manner to be described.

Figure 1:
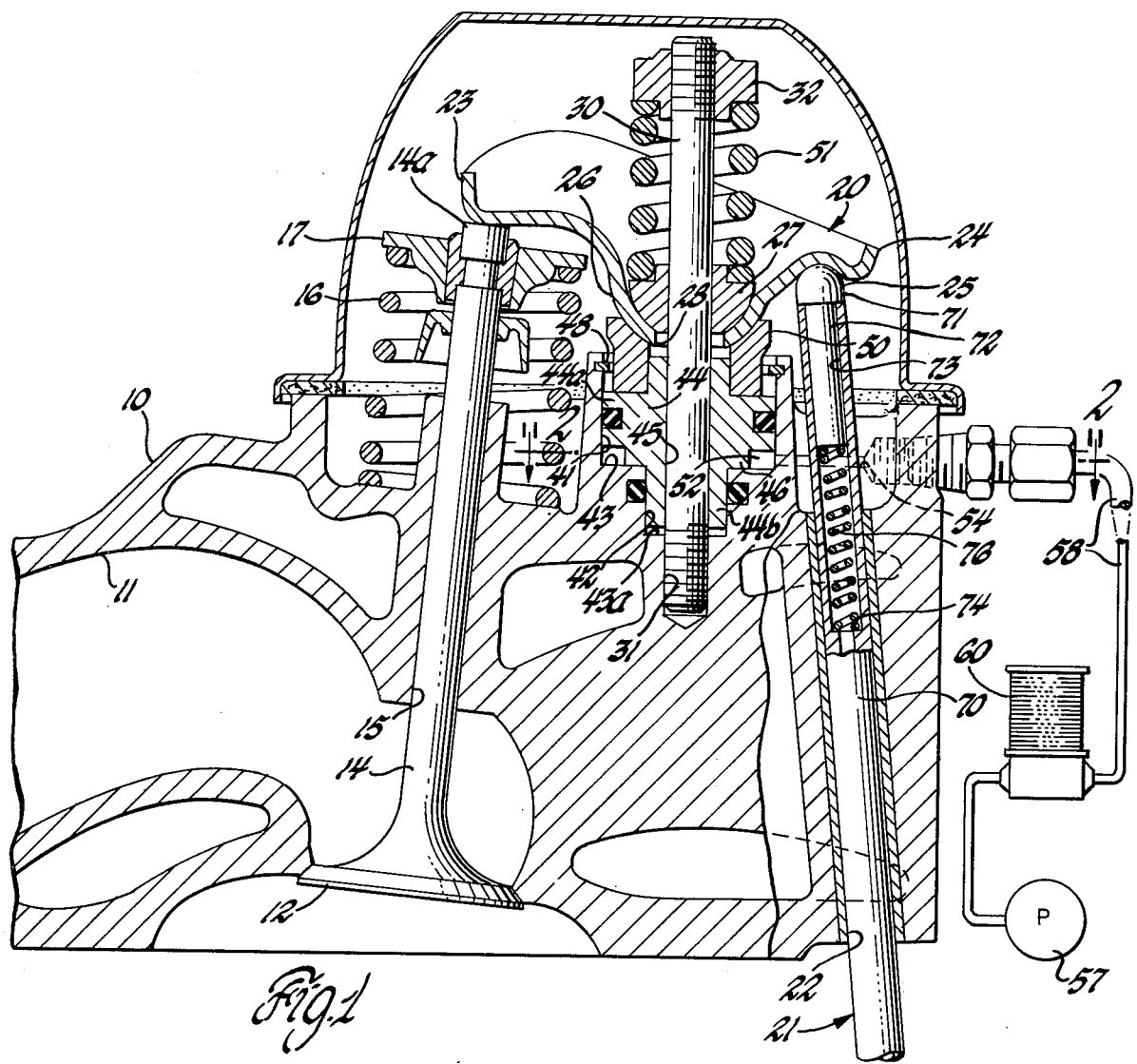
FIG. 1 is a view, partly in section and partly schematic, showing a portion of an internal combustion engine having incorporated therein a valve control mechanism in accordance with the invention, the rocker arm of this mechanism being shown in its normal position to effect opening movement of a valve upon actuation of the rocker arm by a push rod.

Referring now to the drawings and, in particular, to FIG. 1, there is shown a valve control mechanism in accordance with the invention associated with the cylinder of an internal combustion engine, this cylinder being an inactive cylinder of the engine. The engine is of the conventional overhead valve type and includes a cylinder head 10, having a passage therein in communication with a cylinder, not shown, the passage 11 being either an induction passage or an exhaust passage for the cylinder.

Flow between the passage 11 and the cylinder is controlled by a poppet valve 12, the valve stem 14 of which is slidably guided for axial reciprocation in the guide bore 15 provided for this purpose in the cylinder head, with the upper end 14a of the valve stem projecting above the cylinder head. In a conventional manner, the valve 12 is normally maintained in a closed position by a spring 16 encircling the upper portion of the stem 14, with one end of the spring engaging the cylinder head and the other end engaging a conventional retaining washer 17 suitably secured to the stem of the poppet valve.

Opening of the valve 12 is effected by a rocker arm, generally designated 20, that is actuated by a reciprocating push rod, generally designated 21, journalled in the push rod guide bore 22 in the cylinder head 10, the push rod being disposed laterally of the valve stem with its upper end projecting above the cylinder head. The lower end of the push rod 21 would be operated in a conventional manner by a cam, not shown, effecting reciprocal movement of the push rod.

Thus, the push rod 21 and valve 12 are operatively connected by the rocker arm 20 that is formed with arms 23 and 24 overlying and resting upon the upper ends 14a and 25 of the valve stem and push rod, respectively. Adjacent the outer end of its arm 24, the bottom surface of the rocker arm is spherically dished to socketably receive the upper end 25 in bearing relation, and intermediate the push rod and valve, the rocker arm 20 is provided with a spherically dished bearing portion 26, the upper surface of which socketably receives a pivot bearing 27 having a correspondingly shaped bottom surface forming a semispherical seat for the rocker arm. Centrally of the bearing portion 26, the rocker arm is provided with an aperture 28 through which extends an elongated support or mounting stud 30 having its lower end fixedly anchored, as by threaded engagement, in the threaded aperture 31 in the cylinder head, the upper end of the stud 30 being threaded to receive a retainer, in the form of a nut 32 which would normally serve to axially retain the pivot bearing 27.

The valve mechanism, as broadly described thus far, is conventional in that as shown in FIG. 1, the rocker arm is fulcrumed on the pivot bearing 27 intermediate its end so that upon actuation of the push rod 21, the rocker arm would be caused to pivot about the bearing 27 with its arm 23 then engaging the stem of the poppet valve to effect opening of the poppet valve.

In accordance with the invention, the cylinder head 10 is provided with a stepped bore, concentric with the aperture 31, to provide a cylinder open at one end which, in the embodiment shown, is defined by an upper inner peripheral wall 41 extending from the upper surface of the cylinder head to a lower inner peripheral wall 42 with an intervening radial shoulder 43 therebetween, the wall 42 being interconnected by a radial shoulder 43a with aperture 31.

A piston 44, with a central aperture 45 therethrough of a diameter to slidably receive the stud 30, is reciprocably journalled in the cylinder. Piston 44 has an annular central portion 44a of an outside diameter such as to be reciprocable in the portion of the cylinder defined by the peripheral wall 41 and a reduced portion 44b of an outside diameter to be slidably received in the lower portion of the cylinder as defined by wall 42, these two portions of the cylinder having a stepped radial shoulder 46 therebetween. As shown, the piston 44 is reciprocable in the cylinder for movement between a retracted position at which a portion of the shoulder 46 thereof abuts against the radial shoulder 43 and an extended position as defined by a radial stop shoulder extending radially into the cylinder that is provided by an annular retainer ring 48 positioned in a suitable annular groove formed in the wall 41 for this purpose, closely adjacent to the open upper end of the cylinder.

Piston 44, at its upper end, is provided with an abutment spacer seat 50 having a socket cavity therein at its upper end formed complementary to the underside of the bearing portion 26 of the rocker arm 20, this seat 50 being formed integral with the piston or, as shown, formed as a separate element suitably mounted on the piston 44 for movement therewith and centraly apertured to slidably receive the stud 30.

The bearing portion 26 of the rocker arm 20 is thus slidably sandwiched between the spacer seat 50 and the bearing 27 and this assembly is not only biased in one direction, but the piston is moved to and retained in the retracted position, by a coiled spring 51 encircling the stud 30 with one end of the spring in abutment against the nut 32 and its other end in abutment against the bearing 27.

The piston 44 forms with the wall 41 and radial shoulder 43 of the cylinder a chamber 52 that is in communication with a pair of passages 53 and 54 in the cylinder head 10. The passage 53 is connected by a conduit 55, flow through which is controlled by a normally closed solenoid valve 56, to a source of pressurized hydraulic fluid such as, for example, the outlet of the power steering pump 57 of the vehicle in which the engine is used, while the passage 54 is connected by a conduit 58, flow through this conduit being controlled by normally open solenoid valve 60, to the inlet of the pump 57.

Figure 2:
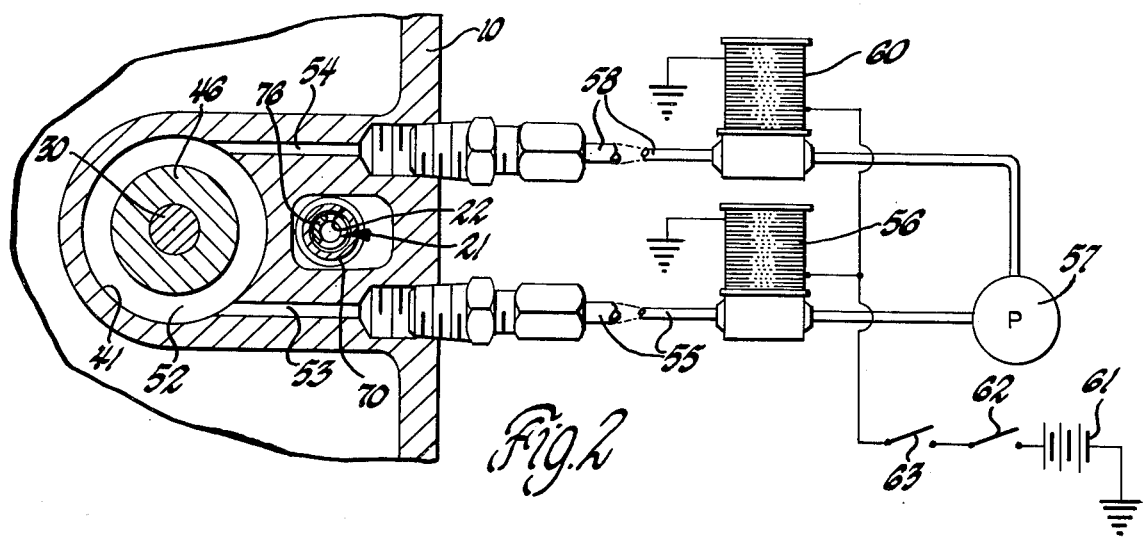
FIG. 2 is a sectional view taken along line 2—2 of FIG. 1.

As shown in FIG. 2, the solenoid valves 56 and 60 are connected to a voltage source 61 for simultaneous operation through the vehicle engine ignition switch 62 and a switch 63 that is suitably operable as a function indicative of engine load. For example, switch 63 may be a pressure switch positioned to sense the pressure of hydraulic fluid used to engage the direct drive clutch in a conventional automatic transmission, not shown, connected in a known manner to the engine. The switch 63 would then be operable to close the circuit to energize the solenoids of the solenoid valves 56 and 60 when the transmission is in the high drive ratio and to open the circuit to deenergize the solenoids when the transmission is in a low drive ratio. Switch 63 would then be similar to that presently used on vehicle ignition timed control systems, such a system being known commercially as a transmission controlled spark system and may be of the type described in U.S. Pat. No. 3,584,521 issued June 15, 1971 to Robert S. Tooker and James J. Dawson.

To effect normal operation of the valve 12 by the rocker arm 20, when the inactive cylinder is operational or active and, to permit lash take-up when it is non-operational or inactive, the push rod 21 is formed as a two-piece unit and includes a push rod 70 and a push rod plunger 71 having an enlarged head forming the upper end 25 engaging the rocker arm 20 with a cylindrical stem 72 extending therefrom that is telescopically received in a bore 73 extending from one end of the push rod 70 to terminate at a radial shoulder 74 within the push rod. The push rod plunger 71 is normally biased in an axial outward direction relative to the rod 70 by a spring 76 positioned in bore 73 to abut at one end against the radial shoulder 74 and at its other end against the free end of stem 72. When the push rod plunger 71 has its stem 72 fully telescoped within the rod 70, that is, when the underside of its end 25 abuts against the top of the rod 70, the push rod plunger 71 and rod 70 are then, in effect, a rigid push rod.

During engine operation, assuming that switch 63 is connected, as previously described, to the transmission, not shown, of the vehicle, switch 62 would be of course closed but switch 63 would be open during the low drive ratio mode of operation of the transmission so that the solenoids of the solenoid valves 56 and 60 are deenergized. Since solenoid valve 56 is a normally closed valve, fluid flow from the pump 57 to the chamber 52 is prevented, while valve 60 which is a normally open valve would permit fluid flow from chamber 52 back to the pump 57.

Under the above conditions, with no fluid under pressure being flowed into the chamber 52, the elements would then be in their respective positions shown in FIG. 1, the force of spring 51 being sufficient to maintain the piston 44 fully retracted and to position and hold the pivot bearing 27 axially on the stud 30 in a position whereby the pivot bearing 27 can act as the fulcrum about which the rocker arm 20 pivots as oscillated by the reciprocating motion of the push rod 21 thereby effecting corresponding reciprocal motion of the valve 12 to effect opening movement of this valve. As previously described, the push rod plunger 71, in this mode of operation, would have its stem portion 72 fully telescoped within the rod 70 and the underside of the large head or end 25 of the push rod plunger would abut against the upper end of the rod 70 so that reciprocating motion of the rod 70 is directly transmitted to the rocker arm 20.

Figure 3:
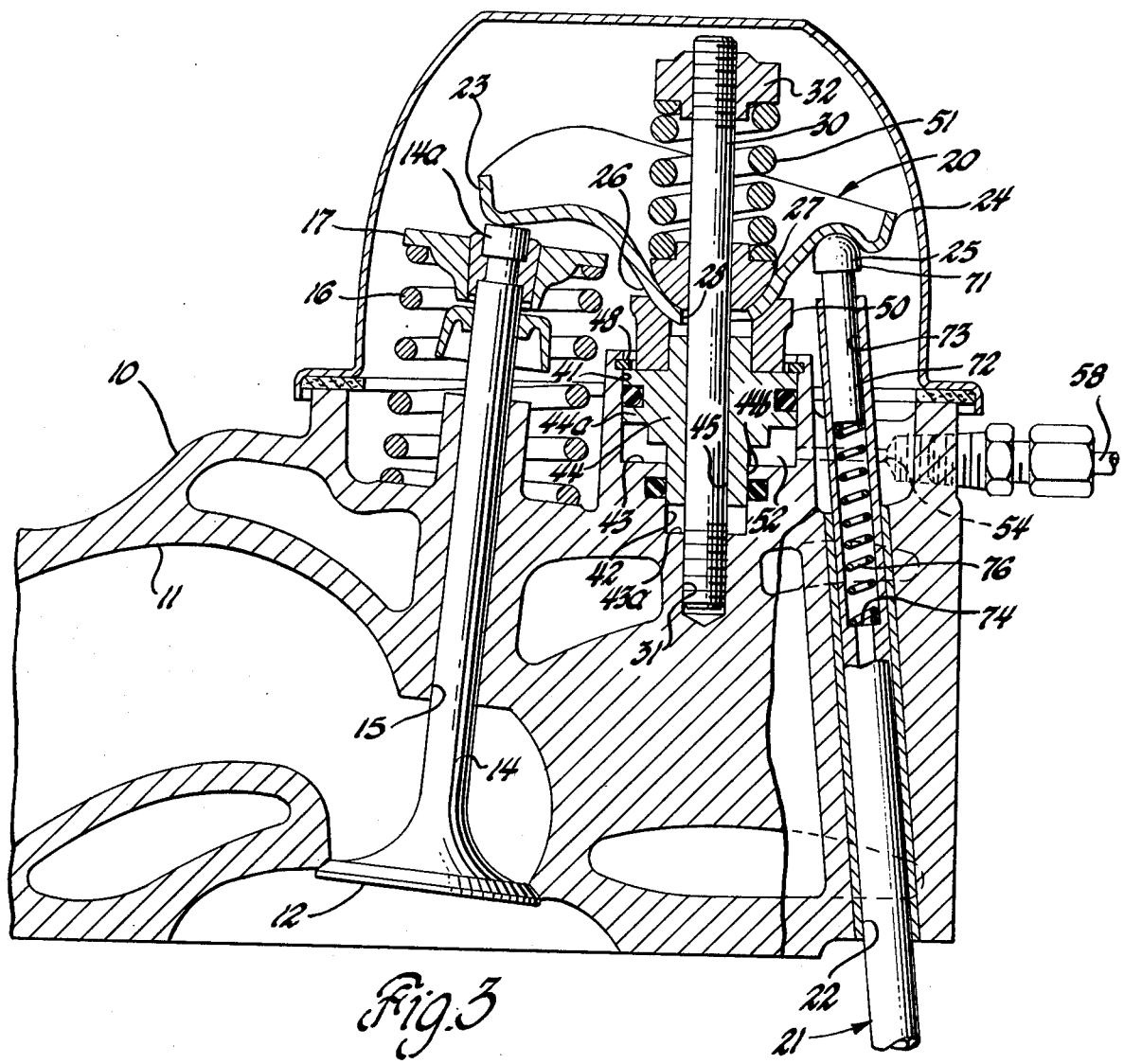
FIG. 3 is a view similar to that of FIG. 1 but showing the position of the various elements of the valve mechanism wherein the rocker arm is positioned so as to not affect operation of the valve.

When the transmission is at a high drive ratio mode of operation, indicative of a light engine load, the switch 63 would be caused to close to thereby energize the solenoids of the solenoid valves 56 and 60, causing valve 56 to open so that high pressure hydraulic fluid flows from the pump 57 into chamber 52 and, at the same time, causing valve 60 to close, thus preventing discharge of fluid from chamber 52. The pressure of the hydraulic fluid thus entering chamber 52 will effect axial movement of piston 44 upward towards its extended position, against the biasing action of spring 51, until it abuts against the retaining ring 48. As this occurs, the rocker arm 20 and the pivot bearing 27 will be moved axially upward along the stud 30 to the position shown in FIG. 3, at which position the arm 23 of the rocker arm 20 would pivot about the end 14a of valve stem 14 and would, in effect, render this valve inoperative to inactivate the cylinder. In this position of the rocker arm 20, its arm 24 would then be out of direct driven engagement relative to the push rod 21 but, as shown, the push rod plunger 71, as biased by spring 76, is still in engagement with the rocker arm to continually apply a lash take-up force, as the rod 70 of the push rod assembly is reciprocated, to thereby take up any lash in the valve mechanism.

What is claimed is:

1. In an internal combustion engine having a cylinder head and reciprocally journalled therein a poppet valve with a return spring connected thereto and a reciprocally driven member for operating the poppet valve in a direction opposed by its spring with each stroke of the member in a direction substantially opposite that of the poppet valve, a rocker for normally transmitting valve operating movement from the member to the poppet valve, said rocker having spaced apart surfaces on one side thereof engageable with oppositely facing surfaces of the member and the poppet valve and a bearing portion intermediate its ends with a bearing surface on the opposite side of said rocker from said spaced apart surfaces, said bearing portion having an aperture therethrough, support means including a stud extending through said aperture and fixed to said cylinder head, said seat means including a seat movable from a first position at which said seat pivotally journals said bearing surface about the rocking axis of said rocker to a second position at which said rocker is movable to a position at which it is pivotally supported by the oppositely facing surface of the poppet valve and, said support means having power means, including hydraulic actuator means, responsive to engine operating conditions, operably connected thereto to effect movement of said seat between said first position and said second position.

2. In an internal combustion engine according to claim 1 wherein said support means includes a stud member fixed to the cylinder head and said seat is a pivot bearing with an aperture therethrough slidably journalled on said stud member in position to engage one side of said rocker and, wherein said power means includes a spring means operatively mounted on said stud member with one end thereof engaging said pivot bearing to normally bias said pivot bearing to said first position, said hydraulic actuator means including a piston reciprocably journalled in the cylinder head with one end of said piston in engagement with said rocker on the opposite side from said pivot bearing.

3. In combination in an internal combustion engine, a cylinder head, a poppet valve having a stem slidably supported in said cylinder head for axial reciprocation, a push rod reciprocally journalled in said cylinder head in substantially the same plane as said valve stem, a rocker for transmitting reciprocable movement between said push rod and said poppet valve, said rocker having oppositely extending arms resting on the upper ends of said stem and said push rod, respectively, and an intermediate bearing portion centrally apertured, an elongated stud member fixed at one end to said cylinder head and extending through said aperture, a pivot bearing slidably mounted on said stud member for movement between a first position in which said pivot bearing pivotally supports said rocker in response to reciprocation of said push rod to effect opposing reciprocable movement of said poppet valve and a second position in which said rocker arm is permitted to move axially along said stud member to a position at which pivotal movement of the rocker in response to reciprocation of said push rod causes said rocker to pivot about the end of said stem of said poppet valve, spring means operatively mounted on said stud member in position to normally bias said pivotal bearing to said first position and, hydraulic actuator means responsive to an engine operating condition operatively connected to said pivot bearing to effect movement of said pivot bearing to said second position.

4. In an internal combustion engine of the split engine type, a cylinder head, a poppet valve and a push rod each axially reciprocable in and terminating externally of said cylinder head, a rocker arm having one end in abutment with said poppet valve and an opposite end in abutment with said push rod and a bearing portion intermediate its ends with an aperture therethrough, an elongated stud member fixed at one end to said cylinder head and slidably extending through said aperture of said rocker arm, a pivot bearing slidably mounted on said stud member and positioned to engage one side of said bearing portion and being axially movable on said stud member between a first position in which said pivot bearing pivotally supports said rocker arm and a second position out of operative pivotal supporting engagement with said rocker arm, a cylinder in said cylinder head, a piston reciprocably mounted in said cylinder for movement between a retracted position and an extended position with one end thereof in abutment against the side of said bearing portion opposite from said pivot bearing, the other end of said piston defining with said cylinder a fluid chamber, valve controlled passage means in communication at one end with said fluid chamber and operably connectable at its other end to a source of pressurized fluid whereby to control the ingress and egress of fluid to said fluid chamber to effect movement of said piston between said retracted position and said extended position and, spring means on said stud member operatively connected to said pivot bearing and to said piston to normally bias said piston toward said retracted position and to move said pivot bearing axially on said stud member to said first position at which said pivot bearing pivotally supports said rocker arm, said piston, when moved by pressurized fluid in said fluid chamber to said extended position, effecting movement of said pivot bearing to said second position.

5. In an internal combustion engine according to claim 4 wherein said push rod includes a plunger having a head with a stem depending therefrom, a rod member having a bore extending axially from one end thereof telescopically receiving said stem and, a spring in said bore normally biasing said plunger axially outward relative to said rod member.

6. In an internal combustion engine according to claim 5 wherein said cylinder is concentric to said stud member and wherein said piston is centrally apertured and slidably encircles said stud member.

* * * * *